US010847060B1

(12) United States Patent
Rose

(10) Patent No.: US 10,847,060 B1
(45) Date of Patent: Nov. 24, 2020

(54) TRADING CARD DISPLAY ASSEMBLY

(71) Applicant: Mike Rose, Lubbock, TX (US)

(72) Inventor: Mike Rose, Lubbock, TX (US)

( * ) Notice: Subject to any disclaimer, the term of this patent is extended or adjusted under 35 U.S.C. 154(b) by 0 days.

(21) Appl. No.: 16/418,608

(22) Filed: May 21, 2019

(51) Int. Cl.

| | |
|---|---|
| ***G06F 1/12*** | (2006.01) |
| ***G09F 1/12*** | (2006.01) |
| ***A47G 1/06*** | (2006.01) |
| ***G09F 15/00*** | (2006.01) |

(52) U.S. Cl.
CPC ............. *G09F 1/12* (2013.01); *A47G 1/0638* (2013.01); *G09F 15/0012* (2013.01); *G09F 15/0018* (2013.01); *A47G 2001/0672* (2013.01)

(58) Field of Classification Search
CPC .................................................... A47G 1/0638
USPC .................................................... 40/703, 706
See application file for complete search history.

(56) References Cited

U.S. PATENT DOCUMENTS 4,532,727 A * 8/1985 Klose ..................... A47G 1/065 40/729
4,706,397 A * 11/1987 Hesener ................. A47G 1/065 40/730
5,082,122 A * 1/1992 Connor, Jr. ............... G09F 1/10 211/41.1
5,087,145 A 2/1992 Cooley
5,186,566 A 2/1993 Cameron
5,419,062 A 5/1995 Polinski
5,522,163 A 6/1996 Neugebauer
5,651,202 A 7/1997 Hewitt
5,887,373 A * 3/1999 Byers ..................... A47G 1/065 40/605
D533,726 S 12/2006 Hutchinson
2014/0237875 A1 8/2014 Randall

FOREIGN PATENT DOCUMENTS

WO WO0019869 4/2000

* cited by examiner

*Primary Examiner* — Kristina N Junge

(57) ABSTRACT

A trading card display assembly for securely displaying trading cards includes a plurality of hanger units. Each of the hanger units is removably coupled to a support surface and the hanger units removably engage each other such that the plurality of hanger units forms a single panel on the support surface. A plurality of display units is each removably coupled to a respective one of the hanger units such that each of the display units is retained on the support surfaces. Each of the display units abuts each other on the hanger units such that the plurality of display units defines a single panel on the hanger units. Moreover, each of the display unit has a respective one of a plurality of trading cards positioned therein.

9 Claims, 10 Drawing Sheets

TRADING CARD DISPLAY ASSEMBLY

CROSS-REFERNCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to display devices and more particularly pertains to a new display device for securely displaying trading cards.

BRIEF SUMMARY OF THE INVENTION

An embodiment of the disclosure meets the needs presented above by generally comprising a plurality of hanger units. Each of the hanger units is removably coupled to a support surface and the hanger units removably engage each other such that the plurality of hanger units forms a single panel on the support surface. A plurality of display units is each removably coupled to a respective one of the hanger units such that each of the display units is retained on the support surfaces. Each of the display units abuts each other on the hanger units such that the plurality of display units defines a single panel on the hanger units. Moreover, each of the display unit has a respective one of a plurality of trading cards positioned therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
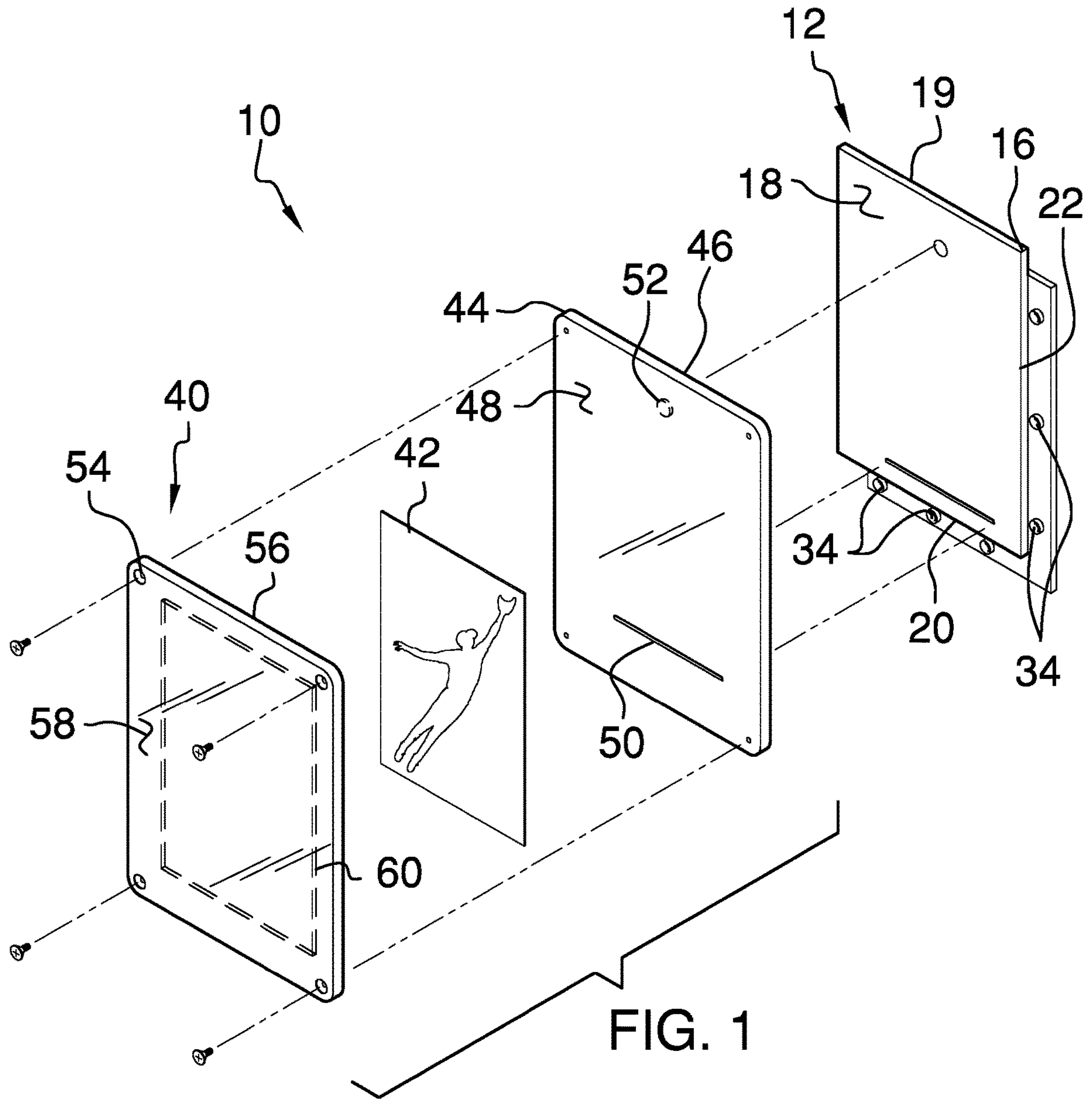
FIG. 1 is an exploded perspective view of a trading card display assembly according to an embodiment of the disclosure.
Figure 2:
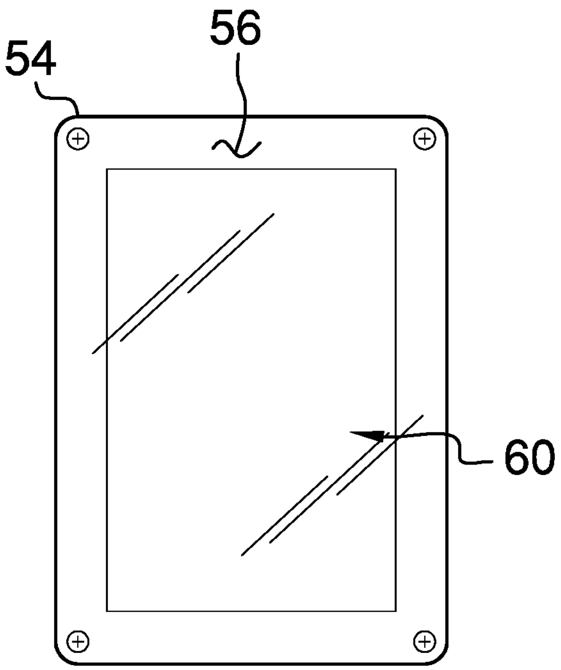
FIG. 2 is a front view of front panel of an embodiment of the disclosure.
Figure 3:
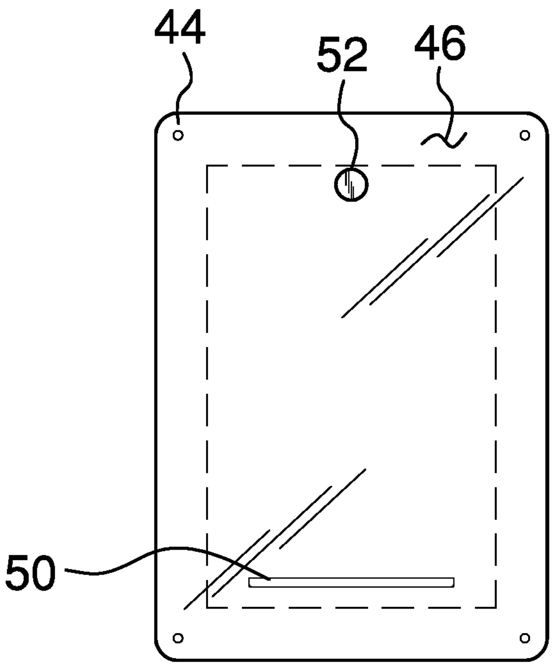
FIG. 3 is a front view of a rear panel of an embodiment of the disclosure.
Figure 4:
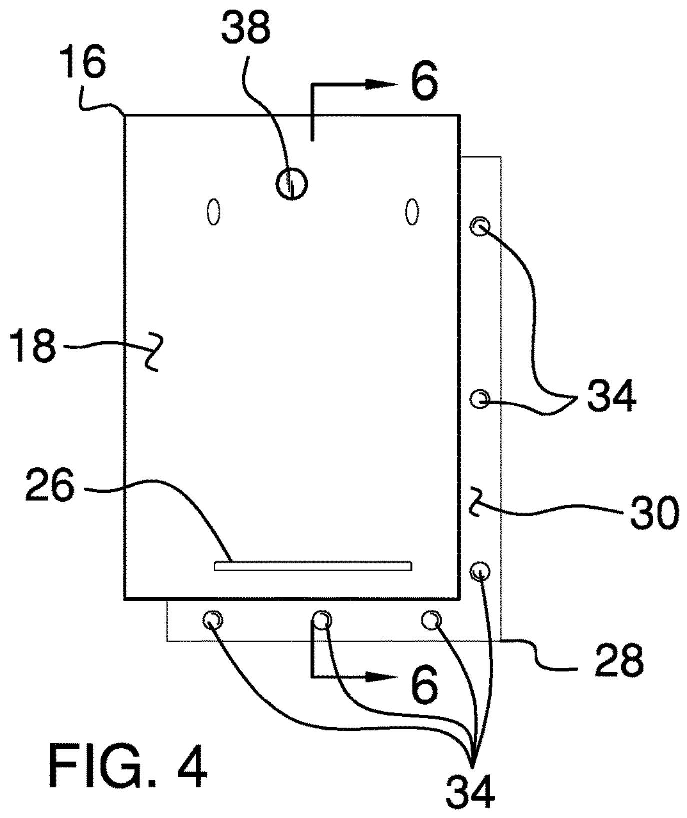
FIG. 4 is a front view of hanger unit of an embodiment of the disclosure.
Figure 5:
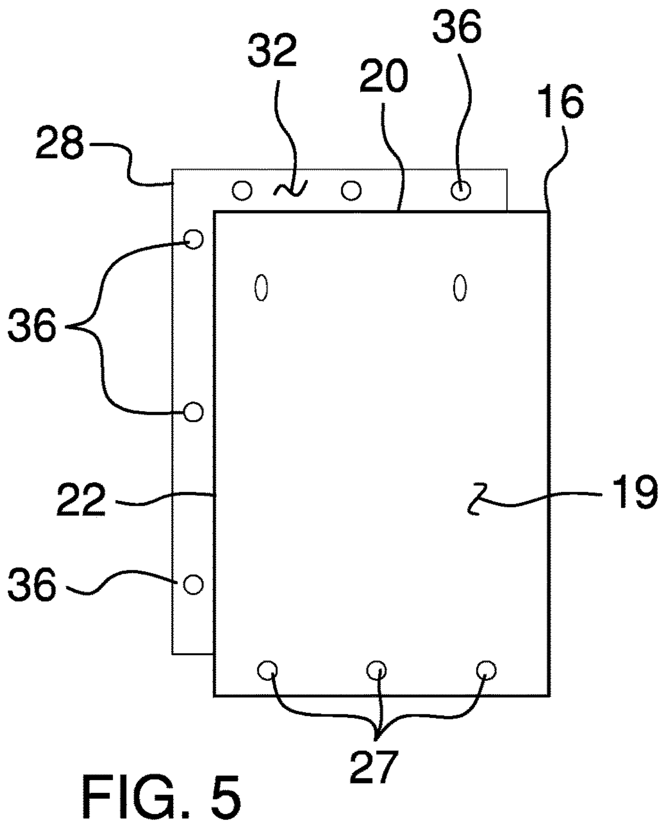
FIG. 5 is a back view of hanger unit of an embodiment of the disclosure.
Figure 6:
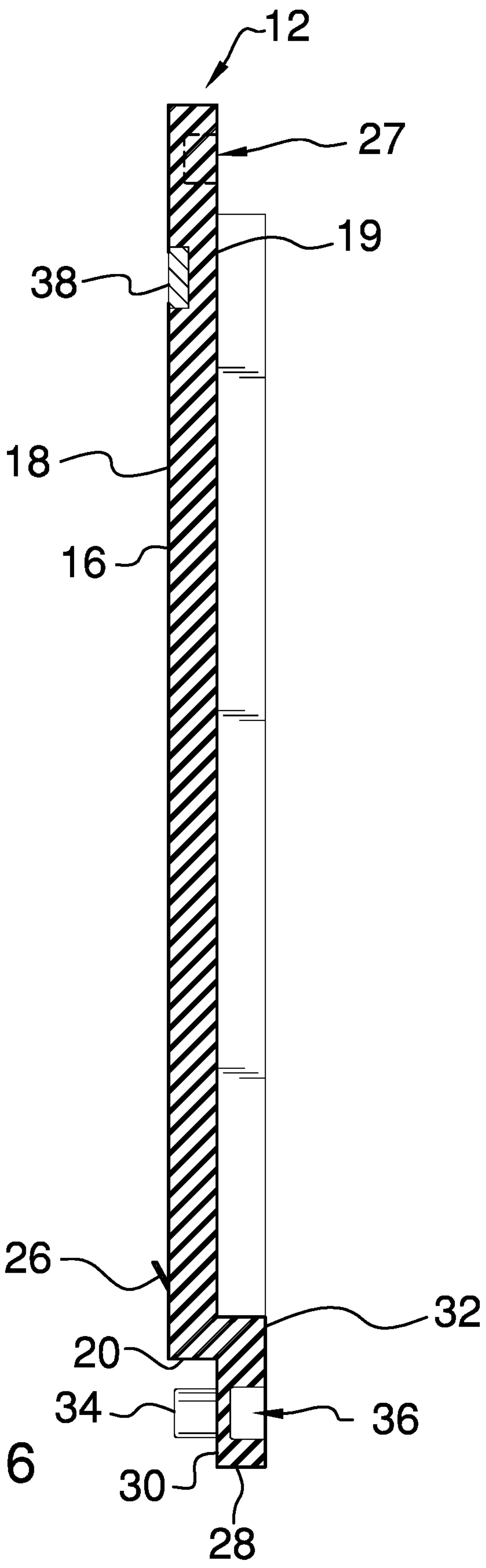
FIG. 6 is a cross sectional view taken along line 6-6 of FIG. 4 of an embodiment of the disclosure.
Figure 7:
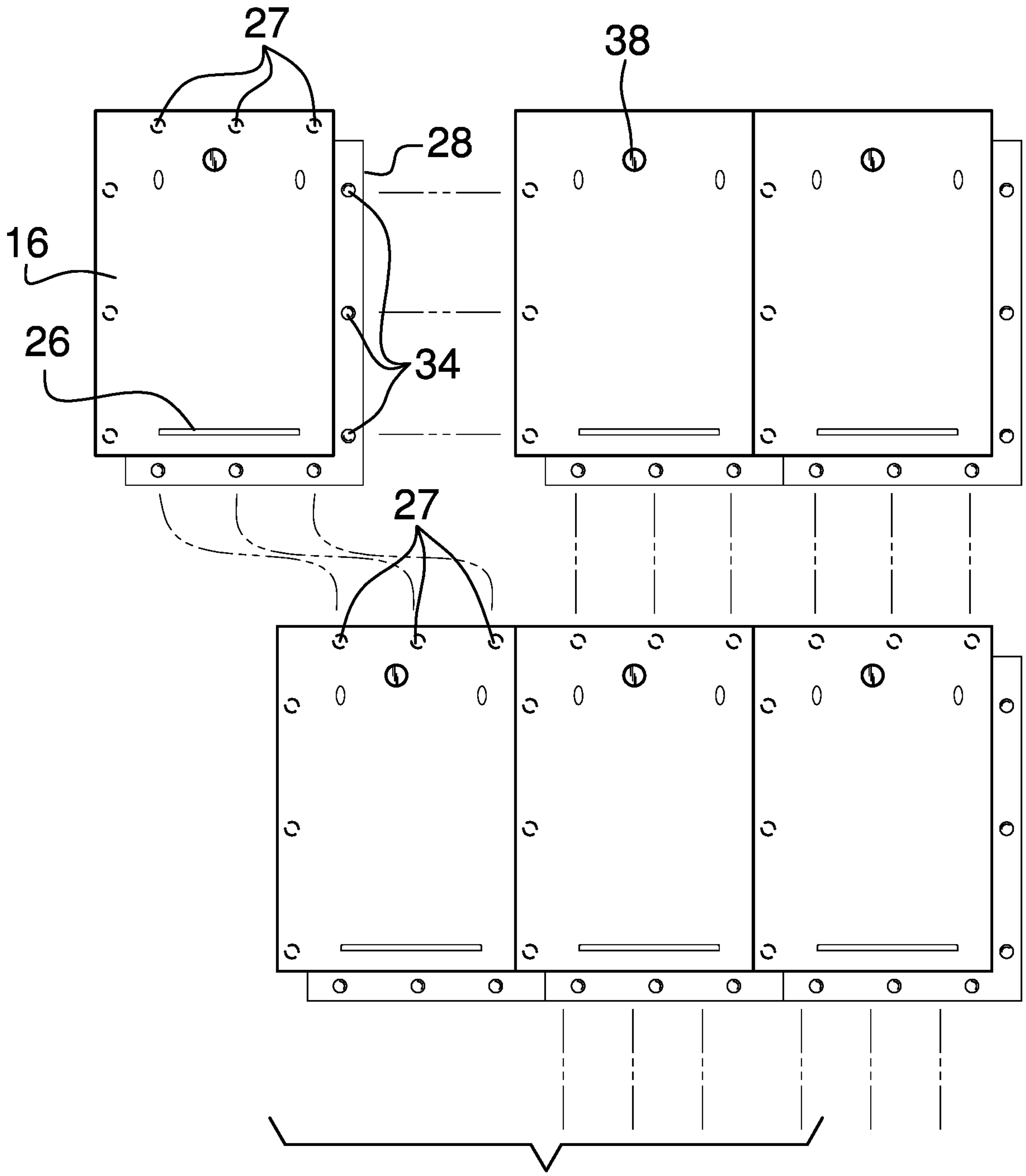
FIG. 7 is an exploded perspective in-use view of an embodiment of the disclosure.
Figure 8:
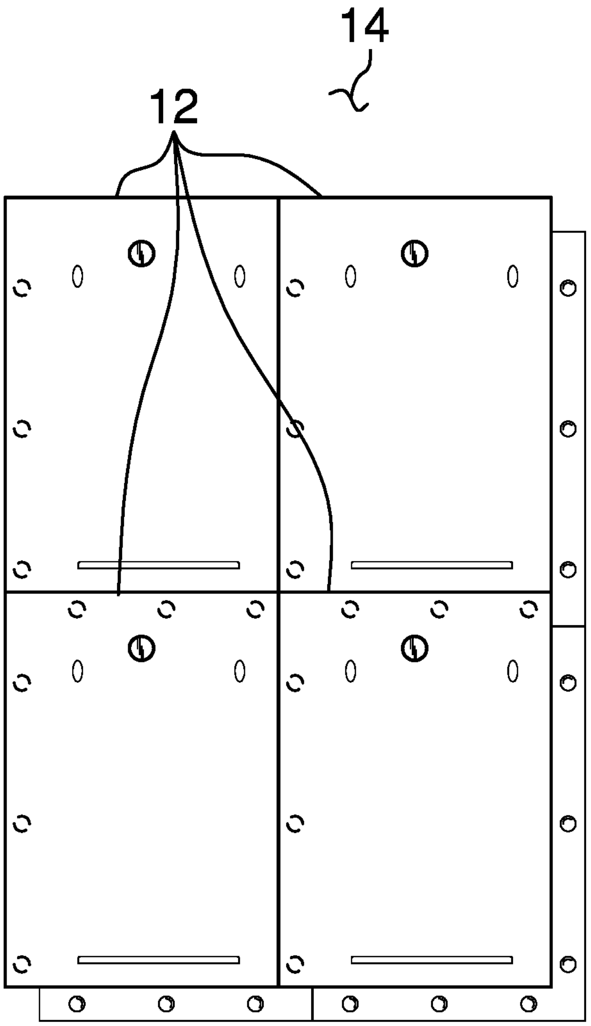
FIG. 8 is a perspective in-use view of an embodiment of the disclosure.
Figure 9:
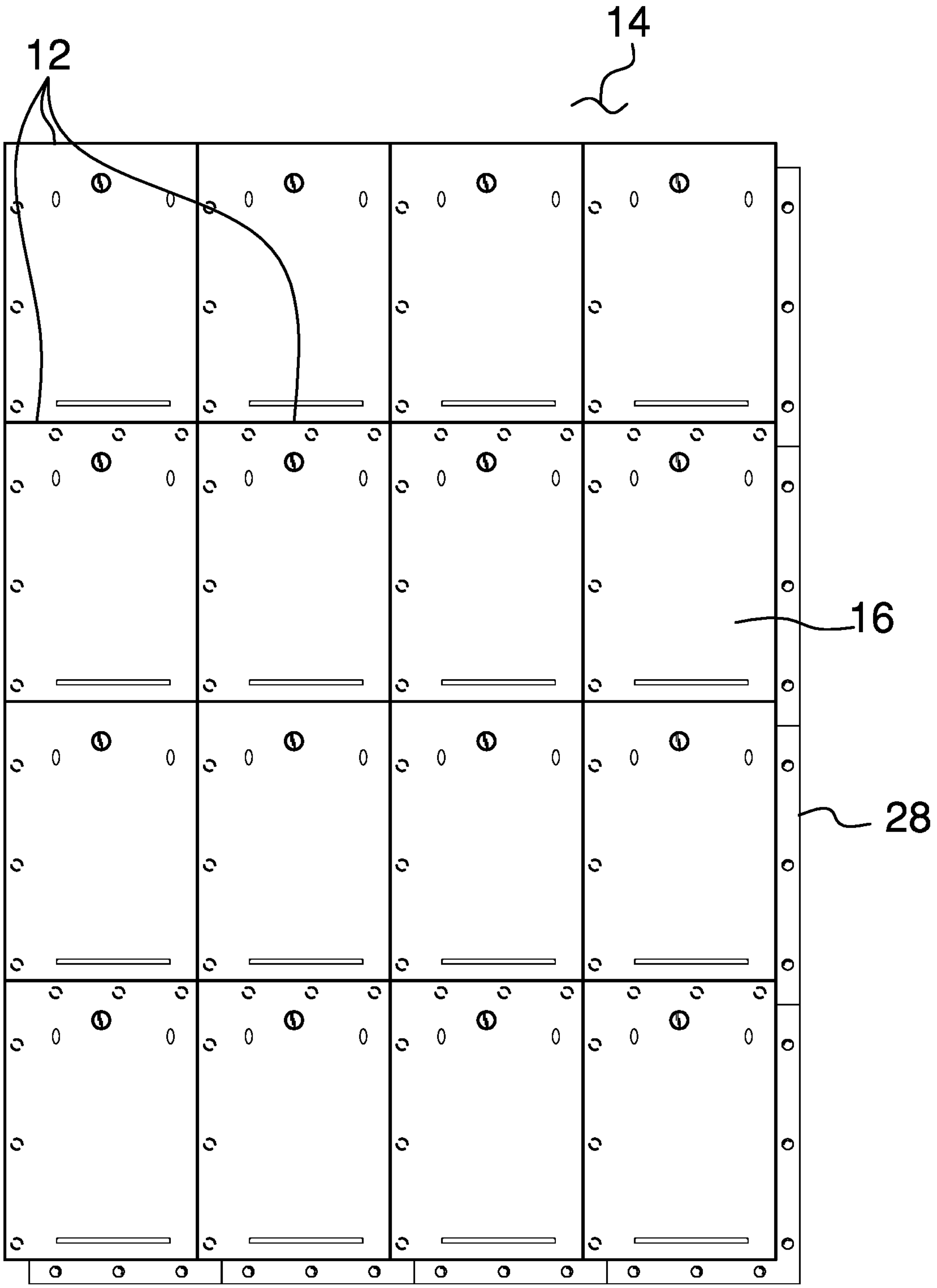
FIG. 9 is a front perspective view of an embodiment of the disclosure.

With reference now to the drawings, and in particular to FIGS. 1 through 12 thereof, a new display device embodying the principles and concepts of an embodiment of the disclosure and generally designated by the reference numeral 10 will be described.

As best illustrated in FIGS. 1 through 12, the trading card display assembly 10 generally comprises a plurality of hanger units 12 that is each removably coupled to a support surface 14. The support surface 14 may be a wall in a room or any other vertical support surface. The hanger units 12 removably engage each other such that the plurality of hanger units 12 forms a single panel on the support surface 14. Additionally, a selectable number of the hanger units 12 can be coupled together to form a single panel of a selectable size.

Each of the hanger units 12 comprises a hanger panel 16 that has a front surface 18, a back surface 19, a bottom edge 20, a top edge 21 and a first lateral edge 22. The hanger panel 16 has a pair of hanging holes 24 each extending through the front 18 and back 19 surfaces to engage a hanger in the support surface 14 for suspending the hanger panel 16 on the support surface 14. The hanger in the support surface 14 may be a picture hanging hook, a nail or other fastener commonly used to suspend objects from a wall. The front surface 18 has a ridge 26 extending forwardly away therefrom. The ridge 26 is spaced from and is oriented collinear with the bottom edge 20, and the ridge 26 angles upwardly on the front surface 18. The back surface 19 has a plurality of coupling wells 27 each extending toward the front surface 18. The coupling wells 27 are spaced apart from each and are distributed along the top edge 21 of the hanger panel 16.

A lip 28 is coupled to and extends away from the hanger panel 16, the lip 28 is coextensive with each of first lateral 22 and bottom 20 edges, and the lip 28 has a forward surface 30 and a rearward surface 32. Moreover, the forward surface 30 is oriented to be coplanar with the back surface 19 of the hanger panel 16 having the rearward surface 32 being offset from the back surface 19 of the hanger panel 16. The forward surface 30 has a plurality of tabs 34 each extending away therefrom, and the tabs 34 are spaced apart from each other and are distributed along the lip 28.

The rearward surface 32 has a plurality of wells 36 each extending toward the forward surface 30, and each of the wells 36 is aligned with a respective one of the tabs 34. Each of the tabs 34 on the lip 28 associated with a respective one of the hanger units 12 engages a respective one of the wells 36 on the lip 28 associated with an adjacent one of the hanger units 12. In this way the front surface 18 of the hanger panel 16 of each of the hanger units 12 forms a uniform surface on the support surface 14. A hanger magnet 38 is coupled to the front surface 18 of the hanger panel 16. Additionally, the coupling wells 27 in the back surface 19 of the hanger panel 16 of a respective one of the hanger units 12 engages a respective one of the tabs 34 on the lip 28 on the bottom edge 20 of the hanger panel 16 associated with a hanger unit 12 that is positioned above the respective hanger unit 12.

A plurality of display units 40 is provided and each of the display units 40 is removably coupled to a respective one of the hanger units 12. In this way each of the display units 40 is retained on the support surface 14 for display purposes. Each of the display units 40 abuts each other on the hanger units 12 such that the plurality of display units 40 defines a single panel on the hanger units 12. In this way the plurality of display units 40 inhibits access to the hanger units 12 thereby reducing the likelihood that the hanger units 12 can be uncoupled from each other or be removed from the support surface 14. Additionally, each of the display units 40 has a respective one of a plurality of trading cards 42 positioned therein. Each of the display units 40 is comprised of a translucent material such that the trading cards 42 are visible through the display units 40. The trading cards 42 may be baseball trading cards, football trading cards and any other type of trading card 42.

Each of the display units 40 comprises a rear panel 44 that has a back surface 46 and a front surface 48. The back surface 46 of the rear panel 44 has a slot 50 extending toward the front surface 48 of the rear panel 44. Additionally, the back surface 46 of the rear panel 44 abuts the front surface 18 of the hanger panel 16 of a respective one of the hanger units 12. The slot 50 engages the ridge 26 on the respective hanger panel 16 for aligning the rear panel 44 on the respective hanger panel 16. Moreover, the trading card 42 is positioned on the front surface 18 of the rear panel 44. A display magnet 52 is coupled to the back surface 19 of the rear panel 44. The display magnet 52 magnetically engages the hanger magnet 38 on the respective hanger panel 16 when the rear panel 44 is positioned on the respective hanger panel 16.

Each of the display units 40 comprises a front panel 54 that has a rear surface 56 and a forward surface 58. The rear surface 56 abuts the back surface 46 of the rear panel 44 to compress the trading card 42 between the front 54 and rear 44 panels. The rear surface 56 of the front panel has a recess 60 extending toward the forward surface 58 of the front panel 54. The recess 60 has dimensions that match the dimensions of the trading card 42 such that the trading card 42 is positionable in the recess 60 for keeping the trading card 42 stationary. The front panel 54 is comprised of a translucent material to facilitate the trading card 42 to be visible therethrough. Additionally, the front panel 54 is comprised of a UV blocking material to protect the trading card 42 from being damaged from UV radiation.

Figure 10:
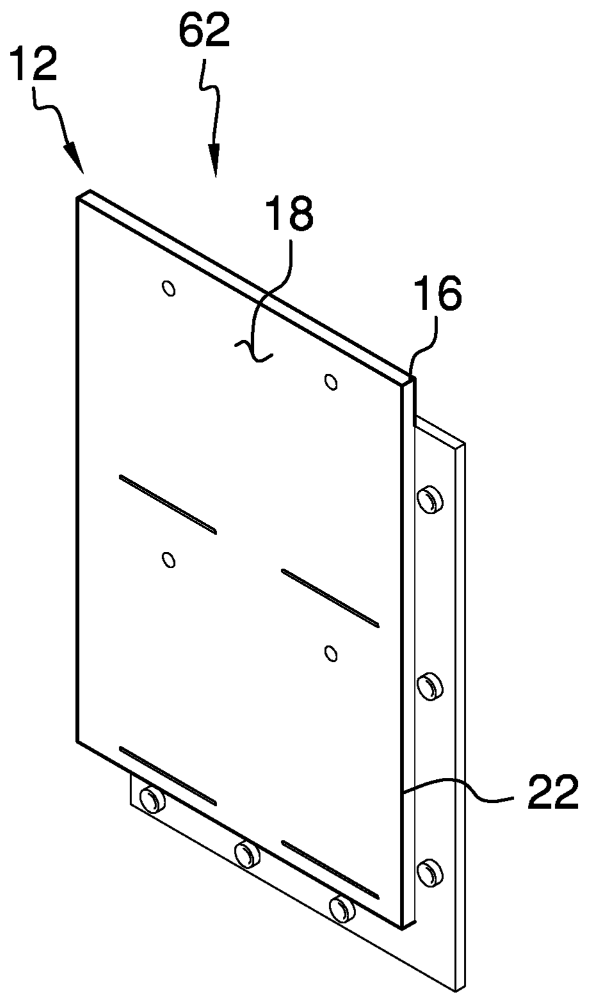
FIG. 10 is a front perspective view of an alternative embodiment of the disclosure showing a hanger panel for four trading cards.
Figure 11:
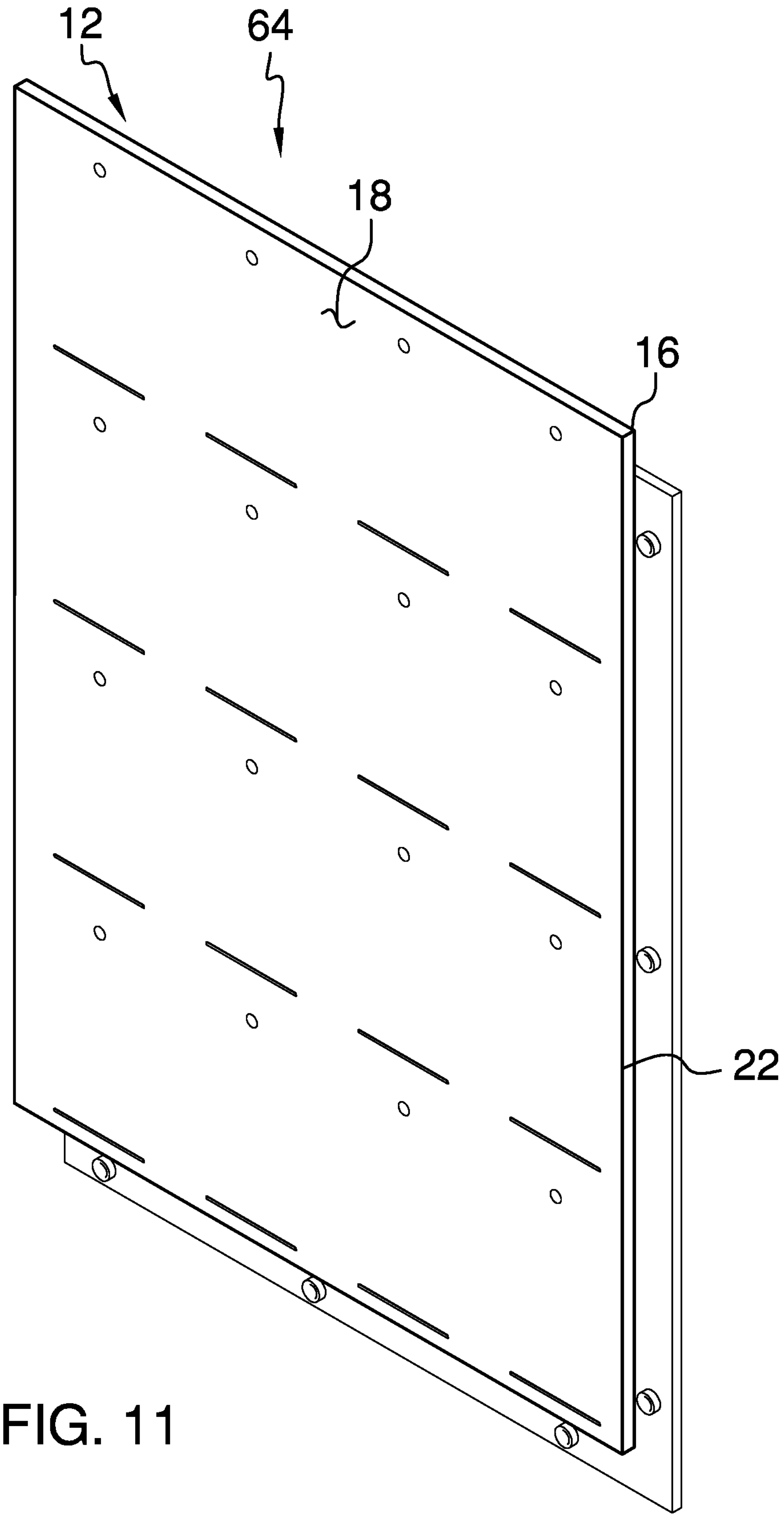
FIG. 11 is perspective view of an alternative embodiment of the disclosure showing a hanger panel for sixteen trading cards.

In an alternative embodiment 62 as is shown in FIG. 10, the front surface 18 of the hanger panel 12 has a height and a width sufficient to accommodate at least four of the display units 40. In this way four of the trading cards 42 can be displayed on the hanger panel 12 without requiring assembly of multiple hanger panels 12 as is required in the previously description. In an alternative embodiment 64 as is shown in FIG. 11, the front surface 18 of the hanger panel 12 has a height and a width sufficient to accommodate at least sixteen of the display units 40. Thus, sixteen of the trading cards 42 can be displayed on the hanger panel 12 without requiring assembly of multiple hanger panels 12 as is required in the previous description.

Figure 12:
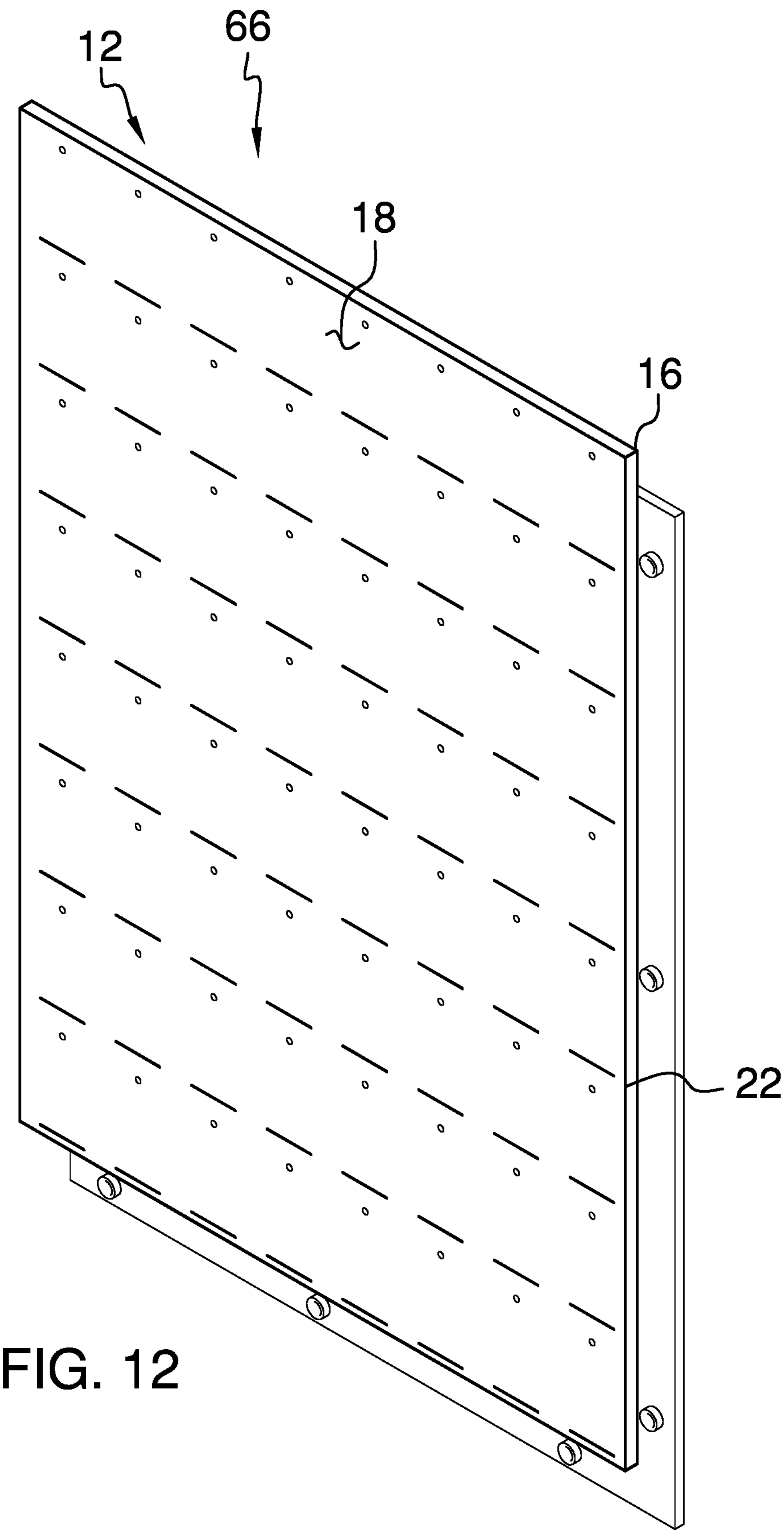
FIG. 12 is front perspective view of an alternative embodiment of the disclosure showing a hanger panel for sixty four trading cards.

In an alternative embodiment 66 as shown in FIG. 12, the front surface 18 of the hanger panel 12 has a height and a width sufficient to accommodate at least sixty four of the display units 40. In this way sixty four of the trading cards 42 can be displayed on the hanger panel 12 without requiring assembly of multiple hanger panels 12 as is required in the previous description. Regardless of the height and the width of the front surface of the hanger panel 12 as described in each of the alternative embodiments 62,64,66, multiple hanger panels 12 can be attached together in the manner described previously. In this way a large number of trading cards 42 can be displayed with less assembly time involved.

In use, a selected number of the hanger units 12 are coupled together and the selected number of hanger units 12 are suspended on the support surface 14. The selected number of hanger units 12 corresponds to the number of trading cards 42 that are to be displayed. The rear panel 44 of each of the display units 40 is positioned on the hanger panel 16 of a respective one of the hanger units 12. Moreover, the display magnet 52 on the rear panel 44 of each of the display units 40 engages the hanger magnet 38 on the hanger panel 16 of the respective hanger unit 12.

Each of the trading cards 42 is positioned on the rear panel 44 of a respective one of the display units 40. Additionally, the front panel 54 of the respective display unit 40 is positioned on the rear panel 44 of the respective display unit 40 thereby compressing each of the trading cards 42 between the front 54 and rear 44 panels of the respective display unit 40. A plurality of fasteners, such as screws or the like, is extended through the front panel 54 of the respective display unit 40 and engages the rear panel 44 of the respective display unit 40. In this manner a selectable number of the trading cards 42 can be displayed while simultaneously restricting access to the trading cards 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trading card display assembly being modular wherein said assembly is configured to display a selectable number of trading cards, said assembly comprising:

a plurality of hanger units, each of said hanger units being removably coupled to a support surface, said hanger units removably engaging each other such that said plurality of hanger units forms a single panel on the support surface;

a plurality of display units, each of said display units being removably coupled to a respective one of said hanger units such that each of said display units is retained on the support surfaces wherein each of said display units is configured to be displayed, each of said display units abutting each other on said hanger units such that said plurality of display units defines a single panel on said hanger units, each of said display unit having a respective one of a plurality of trading cards positioned therein, each of said display units being comprised of a translucent material such that the trading cards are visible through said display units;

each of said hanger units comprising a hanger panel having a front surface, a back surface, a bottom edge and a first lateral edge;

said hanger panel having a pair of hanging holes each extending through said front and back surfaces wherein each of said hanging holes is configured to engage a hanger in the support surface for suspending said hanger panel on the support surface;

said front surface having a ridge extending forwardly away therefrom, said ridge being spaced from and being oriented collinear with said bottom edge, said ridge angling upwardly on said front surface;

said back surface having a plurality of coupling wells each extending toward said front surface, said coupling wells being spaced apart from each and being distributed along said top edge of said hanger panel; and each of said display units comprising a rear panel having a back surface and a front surface, said back surface of said rear panel having a slot extending toward said front surface of said rear panel, said back surface of said rear panel abutting said front surface of said hanger panel of a respective one of said hanger units, said slot engaging said ridge on said hanger panel of said respective hanger unit for aligning said rear panel on said respective hanger panel, said front surface being configured to have the trading card being positioned thereon.

2. The assembly according to claim 1, further comprising a lip being coupled to and extending away from said hanger panel, said lip being coextensive with each of first lateral and bottom edges, said lip having a forward surface and a rearward surface, said forward surface being oriented to be coplanar with said back surface of said hanger panel having said rearward surface being offset from said back surface.

3. The assembly according to claim 2, further comprising:

said forward surface having a plurality of tabs each extending away therefrom, said tabs being spaced apart from each other and being distributed along said lip; and said rearward surface having a plurality of wells each extending toward said forward surface, said each of said wells being aligned with a respective one of said tabs, each of said tabs on said lip associated with a respective one of said hanger units engaging a respective one of said wells on said lip associated with an adjacent one of said hanger units such that said front surface of said hanger panel of each of said hanger units forms a uniform surface on the support surface.

4. The assembly according to claim 1, further comprising:

a hanger magnet being coupled to said front surface of said hanger panel; and a display magnet being coupled to said back surface of said rear panel, said display magnet magnetically engaging said hanger magnet on said respective hanger panel when said rear panel is positioned on said respective hanger panel.

5. The assembly according to claim 1, wherein:

each of said display units includes a front panel having a rear surface and a forward surface, said rear surface abutting said back surface of said rear panel wherein said front panel is configured to compress the trading card between said front and rear panels;

said front panel is comprised of a translucent material wherein said front panel is configured to facilitate the trading card to be visible therethrough; and said front panel is comprised of a UV blocking material wherein said front panel is configured to protect the trading card from being damaged from UV radiation.

6. A trading card display assembly being modular wherein said assembly is configured to display a selectable number of trading cards, said assembly comprising:

a plurality of hanger units, each of said hanger units being removably coupled to a support surface, said hanger units removably engaging each other such that said plurality of hanger units forms a single panel on the support surface, each of said hanger units comprising:

a hanger panel having a front surface, a back surface, a bottom edge, a top edge and a first lateral edge, said hanger panel having a pair of hanging holes each extending through said front and back surfaces wherein each of said hanging holes is configured to engage a hanger in the support surface for suspending said hanger panel on the support surface, said front surface having a ridge extending forwardly away therefrom, said ridge being spaced from and being oriented collinear with said bottom edge, said ridge angling upwardly on said front surface, said back surface having a plurality of coupling wells each extending toward said front surface, said coupling wells being spaced apart from each and being distributed along said top edge of said hanger panel;

a lip being coupled to and extending away from said hanger panel, said lip being coextensive with each of first lateral and bottom edges, said lip having a forward surface and a rearward surface, said forward surface being oriented to be coplanar with said back surface of said hanger panel having said rearward surface being offset from said back surface, said forward surface having a plurality of tabs each extending away therefrom, said tabs being spaced apart from each other and being distributed along said lip, said rearward surface having a plurality of wells each extending toward said forward surface, said each of said wells being aligned with a respective one of said tabs, each of said tabs on said lip associated with a respective one of said hanger units engaging a respective one of said wells on said lip associated with an adjacent one of said hanger units such that said front surface of said hanger panel of each of said hanger units forms a uniform surface on the support surface; and a hanger magnet being coupled to said front surface of said hanger panel; and a plurality of display units, each of said display units being removably coupled to a respective one of said hanger units such that each of said display units is retained on the support surfaces wherein each of said display units is configured to be displayed, each of said display units abutting each other on said hanger units such that said plurality of display units defines a single panel on said hanger units, each of said display unit having a respective one of a plurality of trading cards positioned therein, each of said display units being comprised of a translucent material such that the trading cards are visible through said display units, each of said display units comprising:

a rear panel having a back surface and a front surface, said back surface of said rear panel having a slot extending toward said front surface of said rear panel, said back surface of said rear panel abutting said front surface of said hanger panel of a respective one of said hanger units, said slot engaging said ridge on hanger panel of said respective hanger unit for aligning said rear panel on said hanger panel, said front surface being configured to have the trading card being positioned thereon;

a display magnet being coupled to said back surface of said rear panel, said display magnet magnetically engaging said hanger magnet on said respective hanger panel when said rear panel is positioned on said respective hanger panel; and a front panel having a rear surface and a forward surface, said rear surface abutting said back surface of said rear panel wherein said front panel is configured to compress the trading card between said front and rear panels, said front panel being comprised of a translucent material wherein said front panel is configured to facilitate the trading card to be visible therethrough, said front panel being comprised of a UV blocking material wherein said front panel is configured to protect the trading card from being damaged from UV radiation.

7. The assembly according to claim 6, wherein said front surface of said hanger panel has a height and a width sufficient to accommodate at least four display units thereby facilitating at least four trading cards to be displayed on said hanger panel.

8. The assembly according to claim 6, wherein said front surface of said hanger panel has a height and a width sufficient to accommodate at least sixteen display units thereby facilitating at least sixteen trading cards to be displayed on said hanger panel.

9. The assembly according to claim 6, further comprising wherein said front surface of said hanger panel has a height and a width sufficient to accommodate at least sixty four display units thereby facilitating at least sixty four trading cards to be displayed on said hanger panel.

* * * * *